Inventors
D. S. RIDLER
R. GRIMMOND
By Robert Harding Jr.
Attorney

Inventors
D. S. RIDLER
R. GRIMMOND
By Robert Harding Jr.
Attorney

Nov. 1, 1960 D. S. RIDLER ET AL 2,958,853

INTELLIGENCE STORAGE DEVICES WITH COMPENSATION FOR UNWANTED OUTPUT CURRENT

Filed March 28, 1956 4 Sheets-Sheet 3

Inventors
D. S. RIDLER
R. GRIMMOND
By Robert Harding Jr.
Attorney

Inventors
D. S. RIDLER-
R. GRIMMOND
By [signature]
Attorney

United States Patent Office 2,958,853

Patented Nov. 1, 1960

2,958,853

INTELLIGENCE STORAGE DEVICES WITH COMPENSATION FOR UNWANTED OUTPUT CURRENT

Desmond Sydney Ridler and Robert Grimmond, London, England, assignors to International Standard Electric Corporation, New York, N.Y.

Filed Mar. 28, 1956, Ser. No. 574,518

Claims priority, application Great Britain Apr. 1, 1955

4 Claims. (Cl. 340—174)

This invention relates to storage equipment of the type in which intelligence is stored by setting a storage element to either one of two stable states or by setting a combination of such elements each to either one of two stable states.

In such stores it is common practice to record "0" by setting a storage element to one stable state and to record "1" by setting an element to its other stable state. To read stored information, pulses are applied which re-set all elements to "0." A large voltage output signal is obtained from each element which stores "1" and when "0" is read a small voltage output known as a "sneak" is obtained. It is an object of the invention to provide a circuit for eliminating such a "sneak."

According to the invention there is provided storage equipment which comprises: a storage element and a compensating element, each of said elements being capable of being set to either one of two stable states for the storage of intelligence; an input conductor in co-operative relation with said storage element only for setting said storage element to either one of said two states in response to current flowing in said input conductor in either one of two directions; a reading conductor in operative relation with both of said elements for setting said elements to a first of said states in response to current flowing therein; and an output conductor connected in opposition to said elements so that the outputs obtained from said elements in response to said currents flowing in said reading conductor oppose; the arrangement being such that if an element is in said first state when said current flows in the reading conductor there is a relatively small output on said output conductor due to that element and if an element is in its second state when said current flows in said reading conductor there is a relatively large output on said output conductor due to that element, and that when a pulse of electric current is caused to flow in the reading conductor in a direction such as to set said elements to said first state an output is delivered in said output conductor if the storage element is in its second state and substantially no output is delivered in said output conductor if the storage element is in its second state.

According to the invention there is also provided magnetic storage equipment comprising, a storage toroid; a compensating toroid; an input conductor electro-magnetically coupled to the storage toroid only, for inducing in the storage toroid either of two alternative magnetic states when current in one direction or the other flows in said input conductor; a reading conductor electro-magnetically coupled in like relation to both said toroids for inducing in each toroid one only of said two magnetic states when current flows in a given direction in said reading conductor; and an output conductor electro-magnetically coupled in opposite relation to both said toroids for combining, in opposition, the outputs delivered by said two toroids in response to a pulse of electric current flowing in the reading conductor; whereby, when a pulse of electric current is applied to the reading conductor in a direction such as to induce a first one of said two magnetic states, an output is delivered in the output conductor if the storage toroid is in the second of said two magnetic states, and substantially no output is delivered in the output conductor if the storage toroid is in said first of said two magnetic states.

In this specification and in the associated claims, the term "toroid" indicates a magnetic storage element consisting of magnetic material having a substantially square hysteresis loop associated with an electrical conducting path, for example, a ring of magnetic material through which a conductor or conductors pass, a ring of magnetic material around parts of which conductors are wound, or magnetic material surrounding a conducting path, as described in our application, filed March 8, 1955, Serial No. 492,892.

The invention will now be described with reference to the accompanying drawings which show the invention in its application to magnetic storage elements or toroids as defined above, and in which.

Figure 2:
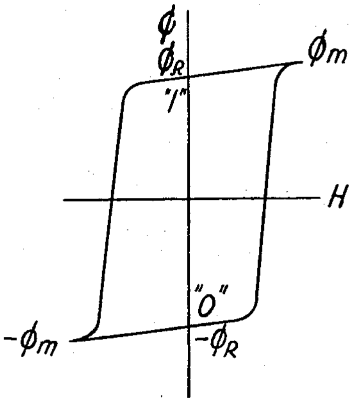
Fig. 2 shows the hysteresis loop for the toroid in Fig. 1.
Figure 1:
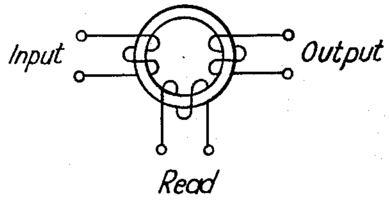
Fig. 1 shows a conventional toroid.
Figure 3:
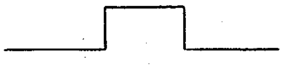
Fig. 3 shows the pulse applied when reading the toroid in Fig. 1.
Figure 4:
Fig. 4 shows the output voltage when "1" is read.

Fig. 2 shows the hysteresis loop for the toroid in Fig. 1. $\phi$ represents the magnetic flux and H the magnetising force. $\phi_R$ indicates the remanent flux and $\phi_M$ the maximum flux. When "1" is stored in the toroid the magnetic flux stands at $+\phi_R$ and when "0" is stored the flux is $-\phi_R$. When reading, the pulse applied is sufficient to re-set each toroid to "0." Therefore, when "1" is being read the flux in the toroid changes from $+\phi_R$ to $-\phi_M$ and then from $-\phi_M$ to $-\phi_R$. The output voltage wave-form induced by this change is shown in Fig. 4. The large area above the datum line is the signal and is proportional to the change in flux from $+\phi_R$ to $-\phi_M$, i.e. it is proportional to $(\phi_R+\phi_M)$. The small area below the datum line is proportional to the change in flux from $-\phi_M$ to $-\phi_R$.

Figure 5:
Fig. 5 shows the output voltage when "0" is read.

When "0" is read, the flux changes from $-\phi_R$ to $-\phi_M$ and then from $-\phi_M$ to $-\phi_R$. The output voltage wave-form induced by this change is shown in Fig. 5. The area above the datum line represents the "sneak." The area below the datum line represents the following output and is equal to the area below the datum line in Fig. 4.

Figure 8:
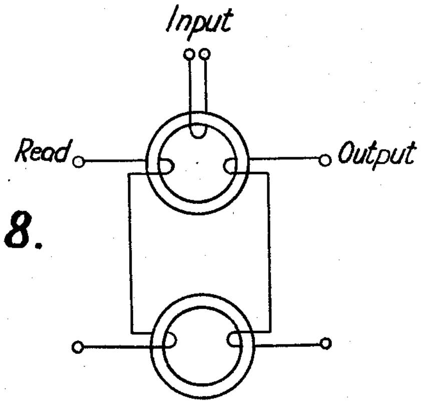
Fig. 8 shows the invention applied to a single toroid.

Now suppose a second toroid is associated with the toroid of Fig. 1 in the manner shown in Fig. 8. The second toroid is identical with the first, but has no input winding. The reading winding of the second toroid is identical with and in series with the reading winding of the first toroid. The output winding of the second toroid is identical with and in series with the output winding of the first toroid, but is connected in the opposite sense.

Figure 6:
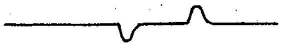
Fig. 6 shows the output voltage of the additional, or compensating, toroid according to the invention.
Figure 7:
Fig. 7 shows the modified output voltage obtained when "1" is read and the invention is adopted.

The operation of the second toroid, which may be called the compensating toroid, is as follows. The reading pulse sets the second toroid to "0." When the output is delivered from the first toroid, the second toroid delivers a "0" output in opposition as shown in Fig. 6. The combined output wave-form for reading a "1" stored in the first toroid is shown in Fig. 7. The signal area is proportional to the total change in flux i.e. to $(\phi_R+\phi_M)$ in the first toroid reduced by $(\phi_M-\phi_R)$ in the second toroid. The signal area is therefore proportional to $2\phi_R$. The following output from the first toroid is equal but opposed to the following output from the second toroid. The two following outputs cancel each other. When "0" is read from the first toroid, there is no combined output, because the outputs of the two toroids cancel each other. It will generally be convenient to make the two toroids identical with each other. This, however, is not essential provided that they give an equal output when a stored "0" is read.

Figure 9:
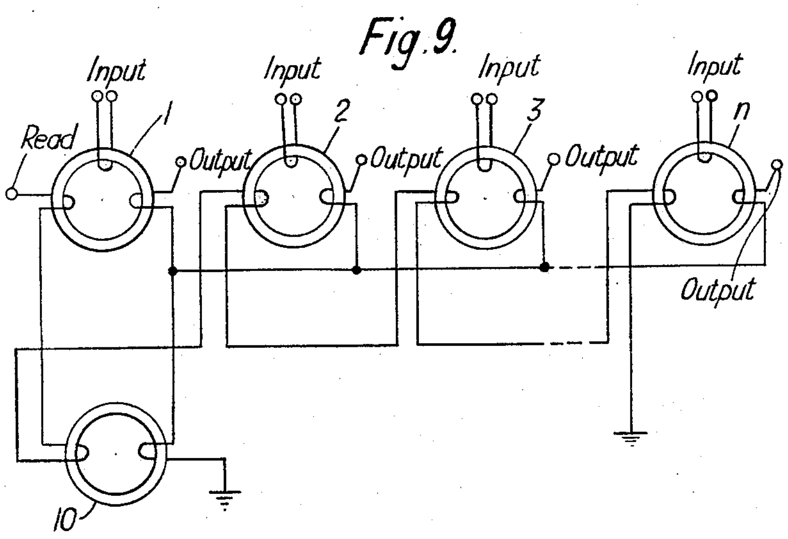
Fig. 9 shows the invention applied to a number of toroids.

Fig. 9 shows a number of toroids 1, 2, 3 . . . *n* which have a common reading circuit. An additional toroid 10 is provided which has no input winding. The reading winding of the toroid 10 is connected in series with the reading windings of the toroids 1, 2, 3 . . . *n*. The output winding of the toroid 10 is connected between earth and the common lead to the output windings of the toroids 1, 2, 3 . . . *n* in such a way that the output of the toroid 10 opposes the output of any of the toroids 1, 2, 3 . . . *n*. The toroid 10 operates in the manner described for the second toroid in Fig. 8. In this arrangement a read pulse is applied to all of the toroids including the compensating toroid 10. Therefore such of the 1, 2, 3 . . . *n* toroids as are storing 1 gives outputs, such as shown in Fig. 4 and the inverted 0 output, as shown in Fig. 6, is subtracted from these outputs. Hence outputs such as shown in Fig. 7, appear at the output terminals of such of the toroids 1, 2, 3 . . . *n* as were set at 1, these toroids being set to 0 by the reading. Those of the toroids 1, 2, 3 . . . *n* which were set at 0 when the reading pulse occurred, give outputs, such as shown at Fig. 5, and from these the inverted 0 output from the toroid 10 is subtracted, giving substantially no output. Thus the "sneaks" of several cores read in parallel are cancelled.

Figure 10:
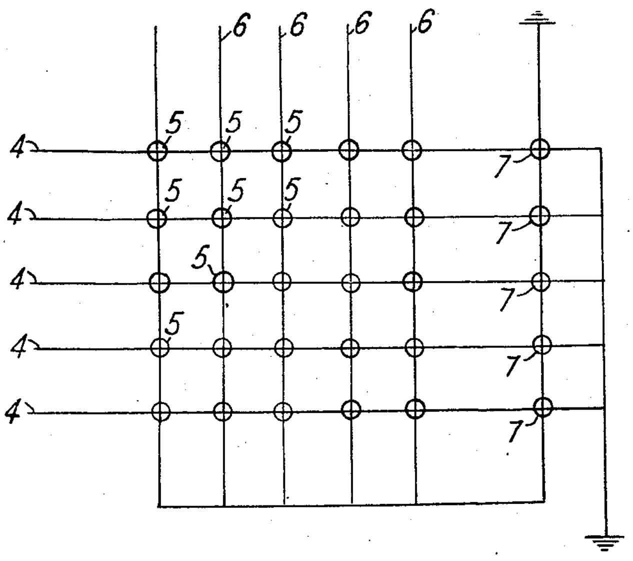
Fig. 10 shows the invention applied to a storage matrix.

Fig. 10 shows the invention applied to a storage matrix. The matrix consists of five rows each of five storage toroids 5, represented by circles at the intersection of the reading wires 4 and the output wires 6. For clarity, the writing wires have been omitted, but any suitable writing system may be used. At the end of each row is an additional or compensating toroid 7. One reading wire 4 for each row is provided, passing through each toroid 5 in the row and finally through the appropriate compensating toroid 7. The reading wires for all the rows are connected to a common earth potential. One output wire 6 for each column is provided, passing through each toroid 5 in the column. Thus the matrix is one in which a single reading pulse causes the intelligence stored in a complete row of toroids to be read therefrom in parallel fashion over the output wires 6 . . . . A common lead from the wires 6 passes in series through all the compensating toroids 7 and is connected to earth potential.

The matrix is read by applying a pulse to the reading wire 4 for the desired row. Simultaneous outputs are delivered in the output wires 6 from those toroids 5 in which a "1" is stored. The reading pulse, however, in addition to passing through the storage toroids 5 in the row, also passes through the corresponding compensating toroid 7. The output connection of the toroid 7 is connected in series with each of the toroids 5 in the row, and therefore the output of the toroid 7 is applied to the output of each of the toroids 5 in the row. Therefore the toroid 7 functions as a compensating toroid in the manner described for the second toroid in Fig. 8, and the compensating toroid for a row of the matrix functions for all the storage toroids of that row in the manner described with reference to Fig. 9.

Figure 11:
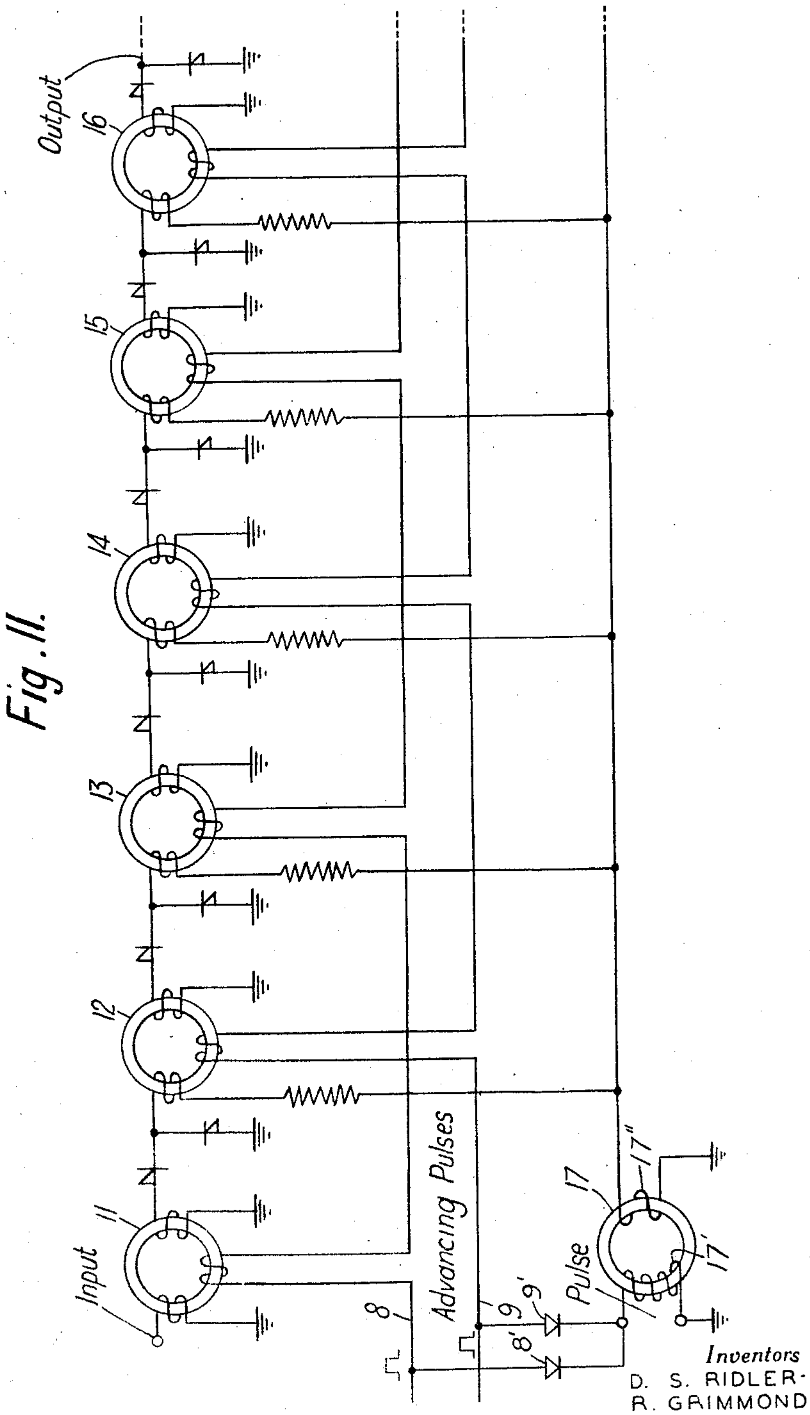
Fig. 11 shows the invention applied to a magnetic pattern movement register (also known as a shifting register)

The invention can also be applied to counting chains and to pattern movement registers (also known as shifting registers). By way of example, Fig. 11 shows the invention applied to a pattern movement register of a well-known type. A series of storage toroids 11, 13, 15 . . . is interspaced by a series of intermediate storage toroids 12, 14, 16 . . . to form a series of toroids 11, 12, 13, 14, 15, 16 . . . in which the output winding of each toroid is connected to the input winding of the next toroid in the series. These input windings are connected through resistors to a common lead from the output winding of the compensating toroid 17.

To operate the register, advancing or reading pulses are applied alternately to the leads 8, 9. The lead 8 passes through the reading windings of each of the storage toroids 11, 13, 15 . . . and a pulse on this lead advances stored information from the storage toroids 11, 13, 15 . . . to the intermediate storage toroids 12, 14, 16 . . . The lead 9 passes through the reading winding of each of the intermediate storage toroids 12, 14, 16 . . . and a pulse on this lead advances stored information from the intermediate storage toroids 12, 14, 16 . . . to the storage toroids 13, 15. . . . Each pulse applied to the lead 8, and each pulse applied to the lead 9, is also applied to the input winding 17' of the compensating toroid 17 through rectifiers 8' and 9'. The output of the toroid 17 from output winding 17'' is applied in opposition to the output of any of the toroids 11, 12, 13, 14, 15, 16 . . . which is being read, and the toroid 17 functions as a compensating toroid in the manner described for the second toroid in Fig. 8.

Many pattern movement registers are adapted for cyclic operation. If this is required, the output winding of the last toroid, for example the toroid 16, would be connected to the input winding of the toroid 11. In this event, the lower end of the input winding of the toroid 11 would be connected to earth through a resistor and the output winding of the compensating toroid 17, as shown in Fig. 11 for the toroids 12, 13, 14. . . .

The currents flowing in a pattern movement register are likely to be greater than those used in the embodiments of the invention so far described. The current flowing in the output winding of the compensating toroid 17 may become great enough to affect the magnetic field in the toroid. Consequently, the input must be made strong enough, e.g. by increasing the number of turns of the input winding, to overcome this tendency. In this event, the compensating toroid 17 will not be identical with the toroids 11, 12, 13 . . . with which it is associated.

Figure 12:
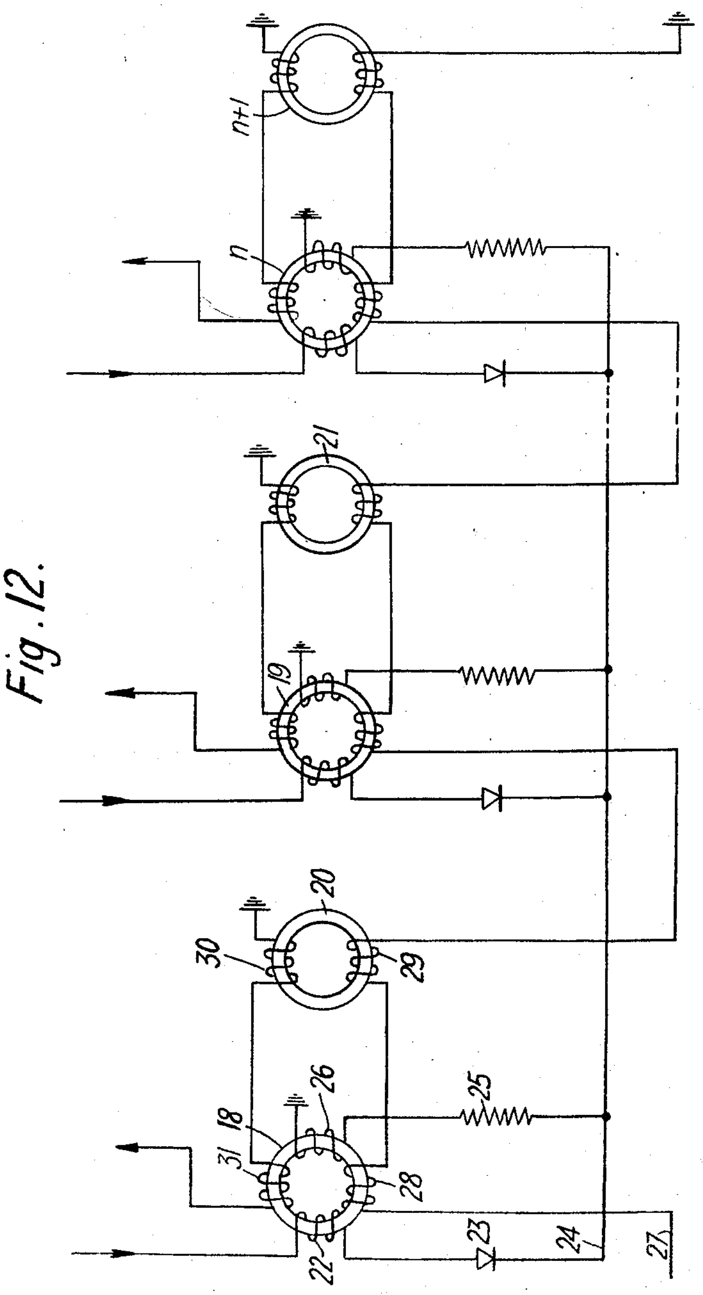
Fig. 12 shows the invention applied to a magnetic multistable register.

Fig. 12 shows the invention applied to a multistable register. Each of a series of toroids 18, 19 . . . *n*, which are referred to as storage toroids, has associated with it a compensating toroid 20, 21 . . . *n*+1. Each storage toroid is associated with its compensating toroid in the same way. The following description of the wiring of the toroids 18, 20, therefore, applies to each other pair of toroids in the register.

The input to the toroid 18 is led through the input winding 22 and the rectifier 23 to a common lead 24. The rectifier 23 is so oriented that current will flow from the winding 22 to the common lead 24 but not in the reverse direction. From the common lead 24 a connection is made through a resistor 25 and a "setting" winding 26 of the toroid 18 to earth. A read pulse can be applied to the conductor 27 which leads to the reading winding 28 of the storage toroid 18, the reading winding 29 of the compensating toroid 20, and is connected to earth. The output winding 30 of the compensating toroid 20 is connected to earth. It is also connected in series with, but in opposition to, the output winding 31 of the storage toroid 18.

When an input is received by the input winding 22, the toroid 18 is set to "1." The input pulse passes the rectifier 23 and reaches the common lead 24. From the common lead 24 there are $n$ parallel paths to earth, the path in the case of the toroid 18 being through the resistor 25 and the "setting" winding 26. The current flowing in the winding 26 is one $n$th part of the current flowing in the winding 22. In the case of the toroid 18, therefore, the "setting" winding 26 is inoperative. In each of the other storage toroids, however, the current is sufficient to set the toroid to "0."

When a read pulse is applied to the conductor 27, the toroid 18 delivers an output. In this operation each storage toroid functions with its associated compensating toroid in the manner already described with reference to Fig. 8.

The invention is particularly useful for use in arrangements such as that described in our application Serial No. 492,892 wherein each toroid is formed by magnetic material surrounding a hole in a block of the material. In such a case the hole forming a compensating toroid is surrounded by similar material to that forming the storage toroid as it forms part of the same piece of magnetic material. Hence where the storage toroid and the compensating toroid are required to be substantially identical, the requirement is easily met by using two similar holes in the same piece of magnetic material. This construction is of greater interest in the case of the matrix store, which could, for instance, in the case of Fig. 10 consist of a plate of ferrite with 5 rows of 6 holes each, the sixth row in each hole providing the compensating toroid.

In the arrangements of Figs. 9 and 11 a single bar of ferrite could be used to provide the toroids, being drilled with one hole more than that needed for the storage toroids in Fig. 9 and for the storage and intermediate toroids of Fig. 11. This extra hole would then provide the compensating toroid.

The embodiments of the invention which have been described in detail all use ferro-magnetic toroids for the storage and compensating elements. However, the invention is not limited to such storage elements. A further variety of storage equipment to which the invention is applicable is that using ferro-electric materials. These materials are capable of assuming one of two stable states of electrification analogous to the two remanent states possible in the ferro-magnetic materials. The response of a ferro-electric element to a reading pulse, which attempts to set it to one of those two stable states, is dependent on the state of the element when the pulse occurs. Thus if the element is already in the state to which the pulse attempts to set it there will be a relatively small output, while if the element is in the other state there will be a relatively large output. The small output referred to forms an undesirable "sneak" which can be cancelled by the use of a compensating element in a manner analogous to that described for the magnetic toroids.

Where the storage equipment uses a number of ferro-electric elements these can be formed by a single crystal of the material having the appropriate electrode configuration.

In such case the compensating element or elements needed for the storage elements of a single ferro-electric crystal can conveniently be portions of the same crystal.

While the principles of the invention have been described above in connection with specific embodiments, and particular modifications thereof, it is to be clearly understood that this description is made only by way of example and not as a limitation on the scope of the invention.

What we claim is:

1. Magnetic storage equipment comprising: a plurality of storage toroids having two alternative stable magnetic states; a single compensating toroid having two alternative stable magnetic states; at least one input conductor for each storage toroid, electro-magnetically coupled thereto for inducing in any one of said storage toroids either of said two alternative magnetic states when current flows in one direction or the other in said input conductor; a reading conductor for each toroid electro-magnetically coupled therein in like relation, means for applying a reading pulse of electric current to all said reading conductors for inducing in each toroid one only of said two magnetic states; and an output conductor for each toroid, the output conductors for said storage toroids being connected in parallel and in series with the output conductor of said compensating toroid, the output conductors of said storage toroids being electro-magnetically coupled in like relation thereto and the output conductor of said compensating toroid being electro-magnetically coupled in opposite relation thereto; whereby, when a pulse of electric current is applied to said reading conductor in a direction such as to induce a first one of said two magnetic states, an output is delivered in said output conductor of each storage toroid in the second of said two magnetic states and no output is delivered in the output conductor of any storage toroid in said first of said two magnetic states.

2. Magnetic storage equipment comprising: a plurality of storage toroids arranged in groups, each storage toroid having two alternative stable magnetic states; a single compensating toroid having two alternative stable magnetic states; an input conductor for each storage toroid electro-magnetically coupled thereto for inducing in said toroid either of said two alternative magnetic states when current in one direction or the other flows through said input conductor; a reading conductor for each group of storage toroids electro-magnetically coupled to all the toroids in the group for inducing in each toroid in the group a first one only of said two magnetic states when current in a given direction flows through said reading conductor; a further reading conductor electro-magnetically coupled to said compensating toroid for inducing therein said first only of said two magnetic states when current flows in a given direction through said further reading conductor; means for connecting said further reading conductor to each of said group reading conductors so that a current pulse applied to either one of said group reading conductors will produce a current pulse in the same direction in said further reading conductor, an output conductor for said compensating toroid; an output conductor for each storage toroid of each group electro-magnetically coupled in opposite relation to said output conductor for said compensating toroid; all of the storage toroid output conductors being connected to said compensating toroid output conductor, whereby: when a pulse of electric current flows in a reading conductor for any group of storage toroids, in a direction such as to induce the first of said two magnetic states and a simultaneous pulse of electric current flows in said further reading conductor associated with said compensating toroid, also in a direction such as to induce the first of said two magnetic states, an output is delivered in the output conductor of each storage toroid in the group which is in the second of said two magnetic states and no output is delivered in the output conductor of any storage toroid in the group which is in the first of said two magnetic states.

3. A pattern movement register comprising: a plurality of storage toroids in series arrangement, each storage toroid having two alternative stable magnetic states; a single compensating toroid having two alternative stable magnetic states; an input conductor for each storage toroid electro-magnetically coupled thereto; an output conductor for each toroid including said compensating toroid electro-magnetically coupled thereto; means for connecting the output conductor of each storage toroid with the input conductor of the next storage toroid in the series; means for connecting the output conductor of said compensating toroid in opposing relation with the input conductors of all but the first of said storage toroids; a reading conductor for each toroid including said compensating toroid electro-magnetically coupled thereto; means for applying reading pulses alternately to the reading conductors of odd and even numbered storage toroids of the series; and means for applying all of said reading pulses to the reading conductor of said compensating toroid.

4. A shifting pattern register, as defined in claim 3, in which the means for connecting the output conductor of each storage toroid to the input conductor of the next storage toroid in the series includes a rectifier poled so as to allow current to flow towards the succeeding toroid and in which the means for connecting the output conductor of the compensating toroid to the input conductors or all but the first storage toroid in the series includes a resistor connected to each input circuit.

References Cited in the file of this patent

UNITED STATES PATENTS

| | | |
|---|---|---|
| 2,734,185 | Warren | Feb. 7, 1956 |
| 2,751,509 | Torrey | June 19, 1956 |
| 2,768,312 | Goodale | Oct. 23, 1956 |
| 2,769,925 | Saunders | Nov. 6, 1956 |